Figure 1:
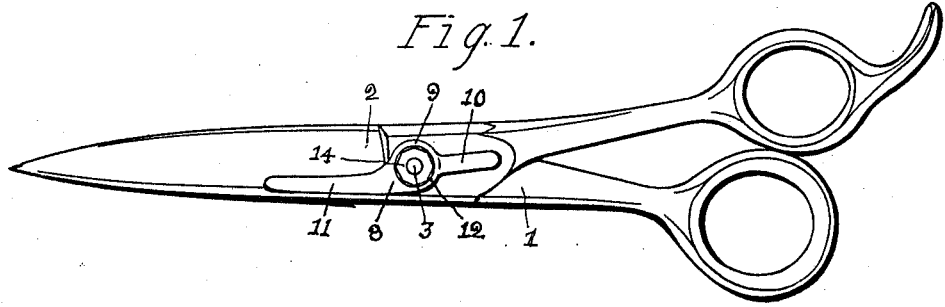

H. E. PUTNEY.
ADJUSTABLE TENSION ATTACHMENT FOR SHEARS.
APPLICATION FILED JAN. 23, 1911.

1,031,370.

Patented July 2, 1912.

Witnesses
Wm. Baumgartner
M. S. Smith

Inventor
Herbert E. Putney
by Robt. B. Wilson
his Attorney

COLUMBIA PLANOGRAPH CO., WASHINGTON, D. C.

UNITED STATES PATENT OFFICE.

HERBERT E. PUTNEY, OF TOLEDO, OHIO, ASSIGNOR OF ONE-HALF TO ISIDORE SILVERMAN, OF TOLEDO, OHIO.

ADJUSTABLE TENSION ATTACHMENT FOR SHEARS.

1,031,370. Specification of Letters Patent. Patented July 2, 1912.

Application filed January 23, 1911. Serial No. 604,129.

*To all whom it may concern:*

Be it known that I, HERBERT E. PUTNEY, a citizen of the United States, residing at Toledo, in the county of Lucas and State of Ohio, have invented new and useful Improvements in Adjustable Tension Attachments for Shears, of which the following is a specification.

My invention relates to an adjustable tension attachment for shears, and has for its object to provide an attachment, whereby pressure may be yieldingly and oppositely applied by the pivot bolt to the blade members at a point distant from their pivotal connection instead of immediately around the pivot, and thereby secure close contact of the edges of the blades at all points from the heel to the points of the blade during each cutting stroke. I accomplish these objects by the construction and combination of parts as hereinafter described and illustrated in the drawings, in which—

Figure 2:
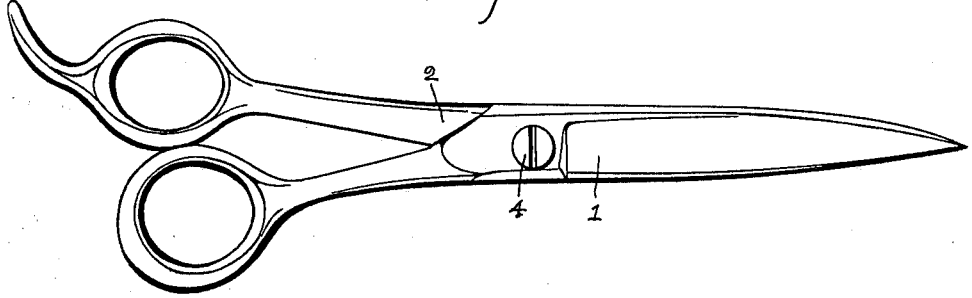
Figure 3:
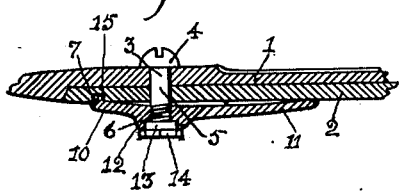
Figure 5:
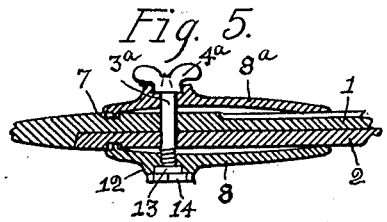
Figure 4:
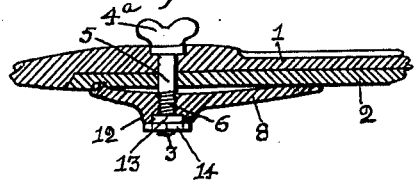

Figure 1 is a side view of shears provided with a tension adjusting attachment constructed in accordance with my invention. Fig. 2 is a similar view of the opposite side of the shears. Fig. 3 is a longitudinal section through the central portion of the shears broken away from the handle and blade portion. Fig. 4 is a similar view showing the pivot head provided with wings instead of a slot. Fig. 5 is a similar view showing a modified form of my tension attachment employing a tension bar for each member of the shears.

In the drawings 1 and 2 are companion shear members, which may be of any of the forms of construction in common use. The members are provided with transverse pivot bores of equal diameters to receive a pivot 3, having a slotted shoulder head 4, a bearing portion 5 of a length to extend through the pivot bores of the shear members and a threaded extension 6.

The member 2 is provided in its outer side, at a suitable distance from the pivot toward its handle portion, with the slightly elongated pin socket 7, and to secure the pivot and produce an adjustable tension pressure on the members, I provide a spring tension bar 8, comprising a circular broadened portion 9, an end portion 10 radial to the portion 9, and an end portion 11 extending oppositely to the end portion 10 tangentially to the portion 9, which latter is thickened by a circular boss 12. The circular portion 9 of the tension bar is bored central of the boss 12 and interiorly threaded to receive the threaded end portion 6 of the pivot, which is of a length to extend through the members 1 and 2 and through the boss 12 of the tension bar 8, which is counterbored to receive the cylindrical portion 13 of a lock nut 14 adapted to be run on the outer end portion of the threaded portion 6 of the pivot.

The end portion 10 of the tension bar 8 extends over the socket 7 and is provided with a pin 15 adapted to enter the socket when the threaded bore of the portion 9 of the tension bar is opposite to and in line with the alined bores of the members 1 and 2, in which position the end portion 11 of the bar extends along the side of the blade portion of the member 2, and nearly flush with its back edge. Between the outer ends of the bar 8 its inner face is slightly arched outward and when the threaded end portion 6 of the pivot 3 is run in to the threaded bore of the bar 8 from the outer side of the member 1, the pressure of the bar 8 is yieldingly applied to the member 2 at points distant from the pivot toward the handle and toward the point of the blade, whereby the bearing faces of the members are held together under a pressure that prevents the blades from being wedged apart by the material in the operation of cutting. Thus secured, in the operation of the shears, the movement of the member 2 relative to the member 1 rotates the pivot in the pivot bore of the member 1, and the movement of the member 1 relative to the member 2 rotates the member 1 on the pivot without affecting the tension of the bar 8 as established.

The tension of the bar 8 may be increased or diminished by first loosening the lock nut 14, and then rotating the pivot 3 to increase or diminish the tension of the bar 8 as desired.

In Fig. 4 is shown a slight modification of the member 1, which is thickened outwardly at the pivot joint and counterbored to receive the pivot bolt which is provided with a wing head 4[a] by which the pivot is run in or out of the bar 8 to adjust the tension. The construction is otherwise the same as shown in Fig. 3.

In Fig. 5 is shown a modified form of my tension attachment, wherein the member 1

(as shown in Fig. 3) is provided with a pin socket 7 and with a tension bar 8ª which in all respects is a duplicate of the bar 8 excepting that the thread is omitted from its pivot bore. The pivot 3ª is of increased length and provided with a wing head 4ª which enters the counterbore of the bar 8ª. Otherwise the construction is the same as in Fig. 4. This form of my tension attachment is preferred for the larger sizes of shears.

In each of the several forms of embodiment of my invention shown and described, the principle of construction is the same, viz: To provide one or both of the members of the shears with an arched spring tension bar mounted on the pivot and extending lengthwise of the members on opposite sides of the pivot toward the handles and along the blades of the members, whereby opposite pressure is produced at the ends of the tension bar or bars on the members by the tension of the bar or bars adjustably flexed by the pivot and locked at such tension by a nut on the pivot, and I therefore do not limit myself to any one of the special forms of construction shown and described.

What I claim to be new is—

In a tension attachment for shears, the combination with a pair of shear members having registering pivot bores, of an arched spring tension bar having its ends engaging the sides of one of the shear members and comprising a circular broadened and outwardly thickened portion opposite the bores of the shear members and flattened spring end portions extending from the circular portion, one radially therefrom toward the handle, and the other tangentially toward the blade of the shear member, and a distance along the back portion of the outer side of the blade, said circular thickened portion of the bar being provided with an outwardly counterbored and inwardly threaded axial bore, in alinement with the bores of the members, a pivot pin having a turning head at one end and threaded at the other, said pivot pin being inserted through the alined bores of the shear members and run into the threaded bore of the tension bar by turning the head, a lock nut run in on the threaded end of the pivot pin and having a cylindrical portion entering the counterbore of the tension bar and engaging the shoulder formed by the counterbore, and means to secure the tension bar against pivotal movement on the pin independent of the shear member with which it is engaged.

In witness whereof I have hereunto set my hand this 5th day of January, 1911.

HERBERT E. PUTNEY.

In presence of—
  WILLIAM S. DENNIS,
  M. S. SMITH.

---

Copies of this patent may be obtained for five cents each, by addressing the "Commissioner of Patents. Washington, D. C."